United States Patent [19]
Larsen

[11] Patent Number: 6,042,622
[45] Date of Patent: *Mar. 28, 2000

[54] PROCESS FOR CRYSTALLIZATION OF ALKALI METAL BICARBONATE SALTS

[75] Inventor: David A. Larsen, Cheyenne, Wyo.

[73] Assignee: BASF Corporation, Mount Olive, N.J.

[ * ] Notice: This patent is subject to a terminal disclaimer.

[21] Appl. No.: 08/688,882

[22] Filed: Jul. 31, 1996

[51] Int. Cl.$^7$ .............................. C01D 7/00; B01D 9/02
[52] U.S. Cl. ...................... 23/300; 23/302 T; 423/179.5; 423/184; 423/442
[58] Field of Search .................... 23/300, 302 R, 23/302 T, 302 A; 423/206.2, 184, 421, 422, 179.5

[56] References Cited

U.S. PATENT DOCUMENTS

| | | | |
|---|---|---|---|
| 4,023,935 | 5/1977 | Levinthar et al. | 23/302 A |
| 4,815,790 | 3/1989 | Rosar et al. | 299/4 |
| 5,518,636 | 5/1996 | Petrille et al. | 210/749 |

OTHER PUBLICATIONS

F. A. Green, "Binding of 14–C Phosphatidylcholine to Sodium Chloride Crystals", Lipids, vol. 5, No. 2, pp. 276–277, 1970.

H. Liu et al., "Effects of Crystalliozation Conditions on Sedimentation in Canola Oil", JAOCS, vol. 71, No. 4, pp. 409–415, Apr. 1994.

S. Tazuma et al., "Degree of fatty acyl chain unsaturation in biliary lecithin dicates cholesterol nucleation and crystal growth", Biochimica et Biophysica Acta 1215, pp. 74–78, 1994.

F. M. Konikoff et al., "Phospholipid molecular species influence crystal habits and transition sequences of metastable intermediates during cholesterol crystallization from bile salt–rich model bile", Journal of Lipid Research, vol. 35, pp. 60–70, 1994.

D. E. Garrett, *Natural Soda Ash: Occurrences, Processing and Use*, pp. 282–285; 303–304; and 402–404, 1992.

J. W. Mullin, *Crystallization*, pp. 207–213; and 258–299, 1972.

A. Wendel, "Lecithin", *Kirk–Othmer Encyclopedia of Chemical Technology*, Fourth Edition, vol. 15, pp. 192–210, 1995.

D. Butts, "Chemicals from Brine", *Kirk–Othmer Encyclopedia of Chemical Technology*, Fourth Edition, vol. 5, pp. 817–837, 1993.

*Primary Examiner*—Gary P. Straub

[57] ABSTRACT

Alkali metal bicarbonate salts, e.g., sodium bicarbonate, are crystallized from aqueous solutions thereof in the presence of a crystal growth promoting amount of lecithin or lecithin containing compositions. Alkali metal bicarbonate salts include sodium bicarbonate, potassium bicarbonate and lithium bicarbonate. The process is described as providing increased amounts of large crystals and a narrower and more uniform crystal size distribution.

20 Claims, No Drawings

PROCESS FOR CRYSTALLIZATION OF ALKALI METAL BICARBONATE SALTS

DESCRIPTION OF THE INVENTION

The present invention relates to the use of a novel crystal growth promoting agent in crystallization processes used to recover alkali metal bicarbonate salts from aqueous solutions containing those salts. More particularly, this invention relates to the use of lecithin and compositions containing lecithin in crystallization processes used to separate and purify alkali metal bicarbonate salts.

Commercial processes for producing alkali metal bicarbonate salts commonly employ a crystallization stage that includes steps for the formation, growth and separation of the salt crystals in order to meet the requirements of yield, purity and size distribution for the product. For example, a crude form of sodium bicarbonate is produced in the Solvay-Ammonia process by reaction crystallization, i.e., the crystallization of sodium bicarbonate from the reaction of an ammoniated brine and carbon dioxide. Since the crude sodium bicarbonate is heavily contaminated with ammonia, it is more economical to calcine it to sodium bicarbonate which is then recarbonated to form a commercial grade of sodium carbonate.

In order to produce analytical or pharmaceutical grade alkali metal bicarbonate, single or multiple recrystallizations of alkali metal bicarbonate salt crystals may be required. As used herein, the term "crystallization processes" includes recrystallization steps that are often used to improve the purity, i.e., reduce the level of impurities, of alkali metal bicarbonate salt crystals.

The use of additives or crystal habit modifiers in crystallization processes is known to promote the formation of crystals of a uniform size and composition. Organic materials reported to be crystal habit and growth modifiers by J. W. Mullin in *Crystallization*, Butterworth & Co., 1972, pp 208–209, include anionic surfactants, e.g., alkyl sulfates, alkane sulfonates and aryl alkyl sulfonates; cationic agents such as quarternary ammonium salts; non-ionic surfactants; and some polyelectrolytes, e.g., polyacrylamides and sodium carboxymethyl cellulose. U.S. Pat. No. 3,836,628 discloses the use of a surfactant in mineral oil as a crystal growth modifier during the crystallization of sodium carbonate monohydrate from an aqueous solution.

Lecithin is widely used in the manufacture of chocolate confections to reduce 'bloom' on the surfaces of the confection as a result of its dispersive effect on the chocolate fat crystals. See page 211 of the aforesaid publication *Crystallization*. Lecithin is also known as a natural crystal inhibitor in oils such as cotton seed, canola and sunflower seed in which the action of lecithin is mainly to retard the growth of crystals. The use of soya lecithin in combination with a dispersing agent such as TWEEN® 80, a polyoxyethylene sorbitan monooleate, in water to neutralize quarternary bactericides is described in U.S. Pat. No. 5,518,636.

In the formation of cholesterol gallstones, biliary lecithin species have been reported to strongly influence the early cholesterol crystallization events. In model biles, lecithins having saturated short-chain, medium-chain and polyunsaturated long-chain fatty acids induce rapid precipitation of cholesterol whereas, lecithins having saturated long-chain fatty acids and natural sphingolmyelins retarded cholesterol crystallization. See "Phospholipid Molecular Species Influence Crystal Habits and Transition Sequences of Metastable Intermediates During Cholesterol Crystallization from Bile Salt-Rich Model Bile", F. M. Konikoff et al, Journal of Lipid Research, Vol 35, 1994, pp 60–70.

The present invention relates to the unexpected discovery that lecithin can be used to promote the formation of more large crystals and a narrower and more uniform crystal size distribution in crystallization processes for the recovery of alkali metal bicarbonate salts, such as sodium bicarbonate. Larger crystals are economically preferred since the costs for growing and processing crystals decreases as the crystal size increases. Other benefits of producing more large crystals include improved dewatering during processing, which results in a finished product of improved purity and higher bulk density. For most industrial purposes, the demand is for a narrower and more uniform crystal size distribution, which results in the crystalline product having good storage and transportation properties.

DETAILED DESCRIPTION

In accordance with the present invention, an alkali metal bicarbonate salt is crystallized from an aqueous solution containing such salt in the presence of a crystal growth promoting amount of lecithin. Lecithin is a mixture of glycerophospholipids containing a variety of substances, such as sphingosylphospholipids, triglycerides, fatty acids and glycolipids that have been obtained from natural sources, e.g., animal, vegetable or microbial sources. Also commercially available are synthetic lecithins, e.g., dioleoyl lecithin, dipalmitoyl lecithin, and modified lecithins, i.e., lecithins from natural sources that have been chemically modified, e.g., hydroxylated or acetylated, or enzymatically modified, e.g., lecithin treated with phospholipase $A_2$ to remove the acyl group from the 2-position to form lysolecithin. All of the aforementioned types of lecithin be used in the process of the present invention.

The glycerophospholipids are glycerin esters having two fatty acid groups and one phosphoric acid group which has been reacted with a component selected from the group consisting of choline, ethanolamine, inositol, serine, glycerol and hydrogen. Accordingly, these lecithin materials are also referred to as 1,2-diacyl-sn-glycero(3)phosphocholine, 1,2-diacyl-sn-glycero(3)phosphoethanolamine, 1,2-diacyl-sn-glycero(3)phosphoinositol, 1,2-diacyl-sn-glycero(3) phospho-L-serine, 1,2-diacyl-sn-glycero(3)phospho(3)-sn-glycerol and phosphatidic acid, respectively.

The main sources of lecithin include vegetable oils, e.g., soybean, cottonseed, corn, sunflower and rapeseed oil, and animal tissues such as egg and bovine brain. Recovery of lecithin is by extraction of the vegetable oil or tissue with organic solvent, alkali or water washings. Commercially, the majority of lecithin produced is derived from soybeans (soya lecithin). There are more than 40 different formulations containing lecithin available commercially. These can vary from crude oily extracts from natural sources to purified and synthetic phospholipids. A review of the manufacturing and processing of lecithin is found in the *Kirk-Othmer Encyclopedia of Chemical Technology*, Fourth Edition, 1993, volume 15, pp 197–201, which is incorporated herein by reference. All of the aforementioned types of lecithin may be used in the process of the present invention.

There are 6 common commercial grades of lecithin available. These are generally liquids except for deoiled lecithin which is a dry powder. They include (1) clarified lecithins which are produced by filtration of either the miscella, i.e., the extracted solution obtained by extraction of lecithin from a vegetable, e.g., soybeans, with organic solvent that contains solvent, crude oil, fines and moisture, or the recovered crude oil; (2) fluidized lecithins wherein the fluidization is done by adding calcium chloride, fatty acids, vegetable oil, or special diluents; (3) compounded lecithins, which are made by addition of emulsifiers like sorbitan esters, polysorbates, or other surfactants; (4) hydroxylated lecithins, which are highly water dispersible and made by the reaction of hydrogen peroxide and lecithin in the presence of a lactic or acetic acid; (5) deoiled lecithins for which the resulting dried product is available in different particle sizes with free flowing properties; and (6) fractionated lecithins, which are made from crude or deoiled lecithins by extraction with alcohol, resulting in alcohol-soluble and alcohol-insoluble fractions with different functionality. All of the aforementioned types of lecithin may be used in the process of the present invention.

The lecithin used in the present invention is preferably derived from a source selected from the group consisting of soybean oil, cottonseed oil, corn oil, sunflower oil, rapeseed oil, eggs and bovine brains. More preferably, the lecithin is derived from soybean oil, corn oil and eggs; most preferably, from soybean oil. The preferred physical form of lecithin and formulations containing lecithin used in the present invention is liquid.

Unless indicated otherwise, all numbers expressing weight ratios and quantities of ingredients used herein in the description and claims, are to be understood as modified in all instances by the term "about".

Lecithin used in the process of the present invention is preferably in a form that is most suitable for the aqueous alkali metal bicarbonate salt solution in which the lecithin is to be incorporated. While lecithin is generally insoluble in water, it is dispersible in water. The dispersibility of lecithin in aqueous salt solutions decreases when the pH of such solutions is below 8.5. In order to aid the dispersion of lecithin in aqueous alkali metal bicarbonate salt solutions having a pH less than 8.5, a surfactant or surfactant system having an HLB or an average HLB, i.e., a hydrophobe/lipophobe balance, of 9 to 10 may be used in combination or in conjunction with the lecithin. Suitable surfactants that may be used for this purpose include nonionic surfactants such as triglycerol monooleate, nonylphenol ethoxylates, polysorbate 80, i.e., polyoxyethylene (20) sorbitan monooleate, block copolymers of propylene oxide and ethylene oxide, ethoxylated alcohols and mixtures thereof. Preferably, the nonionic surfactant is selected from the group consisting of triglycerol monooleate, polysorbate 80 and mixtures thereof. The amount of surfactant used is an amount sufficient to disperse the lecithin in the aqueous alkali metal bicarbonate salt solution, i.e., a dispersing amount. The weight ratio of surfactant:lecithin can range from 1:1 to 1:11 and preferably ranges from 1:2 to 1:10. The dispersability of lecithin may also be improved by chemical modification, e.g., hydroxylation, of the lecithin. Commercially available hydroxylated lecithins are available under the Centrolene® label from Central Soya Company, Inc.

The amount of lecithin present in the aqueous solution containing the alkali metal bicarbonate salt during crystallization is a crystal growth promoting amount, i.e., an amount of lecithin that promotes the formation of increased amounts of large alkali metal bicarbonate salt crystals and a more uniform and narrower crystal size distribution. Stated another way, the use of a crystal growth promoting amount of lecithin in an alkali metal bicarbonate salt solution during crystallization results in a reduction of the number of fines or small crystals, an increase of the number of large crystals and a narrower and more uniform size distribution of crystals when compared to an untreated alkali metal bicarbonate salt solution processed in an identical manner. The crystal growth promoting amount of lecithin can be added to the crystallization vessel or with the aqueous alkali metal bicarbonate salt solution charged to the crystallization vessel. Typically, lecithin is used in amounts of at least 5 parts by weight of lecithin per million parts (ppm) of the aqueous alkali metal bicarbonate salt solution to which lecithin is added. Preferably, the lecithin is used in amounts of from 5 to 1000 ppm, and more preferably, is used in amounts of from 10 to 500 ppm.

In accordance with the present invention, the aqueous alkali metal bicarbonate salt solution to which lecithin is added as a crystal growth promoting agent include solutions containing the metal ions selected from the group consisting of sodium, potassium and lithium. Examples of such alkali metal bicarbonate salts include sodium bicarbonate, potassium bicarbonate and lithium bicarbonate. Preferably, the alkali metal bicarbonate salts are selected from the group consisting of sodium bicarbonate and potassium bicarbonate, and more preferably, the alkali metal bicarbonate salt is sodium bicarbonate.

Crystalline sodium bicarbonate may be produced by the crystallization of a naturally occurring or by-product sodium bicarbonate solution or by carbonation of naturally occurring or synthetically produced sodium carbonate solution. U.S. Pat. No. 4,815,790, which is incorporated herein by reference, discloses a nahcolite solution mining process for producing crystalline sodium bicarbonate of high purity in the as-crystallized form. Solution mining or brining is the recovery of any soluble salt in an underground deposit by dissolving it in situ and bringing the resultant solution to the surface. Further discussion of chemicals that are obtained from brine is found in the *Kirk-Othmer Encyclopedia of Chemical Technology*, Fourth Edition, 1993, Volume 5, pp 817–837, which discussion is incorporated herein by reference.

Potassium bicarbonate and lithium bicarbonate are both produced by reaction crystallization processes in which carbon dioxide is reacted with an aqueous solution of the potassium or lithium carbonate, respectively. Crystallization functions to separate, purify, concentrate and solidify the salt. The methods available for crystallization are many and varied. Crystals can be grown from aqueous salt solutions after a state of supersaturation of the salt in the solution is achieved. The way in which supersaturation is produced depends on the characteristics of the crystallizing system. Some solutes are readily crystallized from their solutions merely by cooling, while others have to be evaporated to a more concentrated form. Industrial crystallization processes include cooling and evaporation, vacuum cooling, controlled seeding, salting out crystallization, reaction crystallization, emulsion crystallization, extractive crystallization, adductive crystallization, desalination by freezing, countercurrent fractional crystallization and melt crystallization. Further discussion of industrial crystallization processes is found in *Crystallization*, supra, pp 258–299, which discussion is incorporated herein by reference.

In accordance with the present process for crystallizing an alkali metal bicarbonate salt from an aqueous solution containing such salt, a crystal growth promoting amount of lecithin is added to the aqueous solution prior to the inception of the crystallization process, thereby to form more large crystals and a narrower and more uniform crystal size distribution. In one embodiment, a crystal growth promoting amount of lecithin is added to an aqueous potassium carbonate solution. Carbon dioxide is added in excess to the solution to react with the dissolved potassium carbonate and form potassium bicarbonate. The resulting crystals are separated from the solution by centrifugation and dried. In another embodiment, a crystal growth promoting amount of lecithin is added to a solution of water being sparged with small bubbles of carbon dioxide in order to add carbon dioxide in excess. Lithium carbonate, which is only slightly soluble in water but is soluble in dilute acid, is dissolved into the lecithin containing aqueous solution, which is now slightly acidic due to the presence of carbon dioxide, and forms lithium bicarbonate. The resulting crystals are separated from the solution by centrifugation and dried.

The present invention has been described with reference to specific details of certain embodiments thereof, however, it is not intended that such details should be regarded as limitations upon the scope of the invention, except insofar as they are included in the accompanying claims.

I claim:

1. In the process of crystallizing an alkali metal bicarbonate salt from an aqueous solution containing such salt, the improvement comprising crystallizing said alkali metal bicarbonate salt in the presence of a crystal growth promoting amount of lecithin.

2. The process of claim 1 wherein said aqueous solution is produced by solution mining of nahcolite.

3. The process of claim 1 wherein the amount of lecithin used is at least 5 parts per million parts of the aqueous salt solution.

4. The process of claim 3 wherein the amount of lecithin used is from 5 to 1000 ppm.

5. The process of claim 4 wherein the amount of lecithin used is from 10 to 500 ppm.

6. The process of claim 1 wherein said lecithin is derived from a source selected from the group consisting of soybean oil, cottonseed oil, corn oil, sunflower oil, rapeseed oil, eggs and bovine brains.

7. The process of claim 6 wherein said lecithin is derived from a source selected from the group consisting of soybean oil, corn oil and eggs.

8. The process of claim 7 wherein said lecithin is derived from soybean oil.

9. The process of claim 1 wherein said lecithin is hydroxylated.

10. The process of claim 1 wherein the lecithin used is a composition comprising lecithin and surfactant, and the weight ratio of surfactant:lecithin in said composition is from 1:1 to 1:11.

11. The process of claim 10 wherein said weight ratio of surfactant:lecithin is from 1:2 to 1:10.

12. The process of claim 10 wherein said surfactant is a nonionic surfactant selected from the group consisting of triglycerol monooleate, nonylphenol ethoxylates, polyoxyethylene (20) sorbitan monooleate, block copolymers of propylene oxide and ethylene oxide, ethoxylated alcohols and mixtures thereof.

13. The process of claim 12 wherein said surfactant is selected from the group consisting of triglycerol monooleate, polyoxyethylene (20) sorbitan monooleate and mixtures thereof.

14. In the process for crystallizing an alkali metal bicarbonate salt selected from the group consisting of sodium bicarbonate, potassium bicarbonate and lithium bicarbonate from an aqueous solution containing said alkali metal bicarbonate salt, the improvement comprising crystallizing said alkali metal bicarbonate salt in the presence of a crystal growth promoting amount of lecithin.

15. The process of claim 14 wherein the amount of lecithin used is at least 5 parts per million parts of the aqueous salt solution.

16. The process of claim 15 wherein said lecithin is derived from a source selected from the group consisting of soybean oil, cottonseed oil, corn oil, sunflower oil, rapeseed oil, eggs and bovine brains.

17. The process of claim 16 wherein said mineral salt is selected from the group consisting of sodium bicarbonate and potassium bicarbonate.

18. The process of claim 17 wherein the amount of lecithin used is from 5 to 1000 ppm.

19. The process of claim 18 wherein lecithin is derived from soybean oil.

20. The process of claim 19 wherein said mineral salt is sodium bicarbonate.

* * * * *

UNITED STATES PATENT AND TRADEMARK OFFICE
Certificate

Patent No. 6,042,622                                                                Patented: March 28, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David A. Larsen, Cheyenne, WY; and Roger L. Day, Rifle, CO.

Signed and Sealed this Eighth Day of July 2003.

TOM G. DUNN
*Supervisory Patent Examiner*
Art Unit 1725